United States Patent [19]

Duncan et al.

[11] 4,214,345
[45] Jul. 29, 1980

[54] MACHINE FOR SEVERING POULTRY INTO PREDETERMINED PORTIONS

[75] Inventors: William D. Duncan; Carolyn L. Duncan, both of Kokomo, Ind.

[73] Assignee: Duncan Creations, Inc., Kokomo, Ind.

[21] Appl. No.: 936,046

[22] Filed: Aug. 23, 1978

Related U.S. Application Data

[63] Continuation of Ser. No. 725,559, Sep. 22, 1976, abandoned, which is a continuation-in-part of Ser. No. 583,875, Jun. 5, 1975, abandoned, which is a continuation-in-part of Ser. No. 436,361, Jan. 24, 1974, Pat. No. 3,950,820.

[51] Int. Cl.² ............................................. A22C 21/00
[52] U.S. Cl. ......................................... 17/11; 83/168
[58] Field of Search ..................... 17/11, 52, 57, 54; 83/168, 169

[56] References Cited

U.S. PATENT DOCUMENTS

| | | | |
|---|---|---|---|
| 602,943 | 4/1898 | Hinkley | 83/168 |
| 1,810,144 | 6/1931 | Oursler | 83/169 |
| 3,303,526 | 2/1967 | La Pine et al. | 17/57 |
| 3,522,623 | 8/1970 | Pyron | 17/11 |
| 3,561,044 | 2/1971 | Evich | 17/54 |
| 3,623,520 | 11/1971 | Nield | 83/169 |
| 3,639,945 | 2/1972 | Duncan et al. | 17/11 |
| 3,671,999 | 6/1972 | Downs | 17/11 |
| 3,805,328 | 4/1974 | Strandine et al. | 17/11 |
| 3,816,875 | 6/1974 | Duncan et al. | 17/11 |
| 3,950,820 | 4/1976 | Duncan et al. | 17/11 |

Primary Examiner—Willie G. Abercrombie
Attorney, Agent, or Firm—Fisher, Christen & Sabol

[57] ABSTRACT

The high speed rotary cutters of a machine for automatically severing whole poultry bodies into separate portions are provided with nozzles which direct jets of cold water against the major areas of both surfaces of the cutters to increase their efficiency, and an enclosure which confines the water thrown off from the cutters is provided with a grid which prevents the severed portions from coming into contact with the water being removed from the enclosure.

7 Claims, 3 Drawing Figures

MACHINE FOR SEVERING POULTRY INTO PREDETERMINED PORTIONS

This application is a continuation of our copending application Ser. No. 725,559, filed Sept. 22, 1976, now abandoned, which is a continuation-in-part of our application Ser. No. 583,875, filed June 5, 1975, now abandoned, which is a continuation-in-part of application Ser. No. 436,361, filed Jan. 24, 1974, now U.S. Pat. No. 3,950,820, said patent being an improvement over our earlier U.S. Pat. No. 3,639,945, granted Feb. 8, 1972.

The present application is also an improvement over our prior U.S. Pat. No. 3,816,875, granted June 18, 1974, which discloses and claims an improved method for cutting meat, especially poultry, by using a high-speed, rotary knife to the surface of which a controlled stream of cold water is applied during the cutting process.

Our prior U.S. Pat. No. 3,639,945 discloses and claims, inter alia, an apparatus of the type wherein an eviscerated poultry body is introduced at the top of a vertical, downwardly extending, partially gravity operated conveyor system. A series of guide means are included to assist in bringing various portions of a poultry carcass into contact with a series of rotary cutters, the bird is introduced into the conveyor system tail first with the guides holding the wings away from the body so that the wings will be positioned to be severed from the body by a first pair of rotary cutters from where the wings drop to the bottom of the machine for collection. Thereafter, the conveying system carries the body into contact with a second pair of rotary blades which are arranged tangentially to each other for severing the breast meat and the legs, the thighs remaining attached to the body. Substantially simultaneously, a rotary cutter also splits the body into two pieces along the plane of the backbone. The breast meat drops down to the collection area and the two body portions with the attached thigh portions enter a chute which leads to another rotary cutter for severing each of the thighs from the respective backs, the resulting four pieces then dropping into the collection area.

The apparatus disclosed and claimed in said U.S. Pat. No. 3,950,820, in general follows the same sequence of operations of the earlier machine, described above, but it differs in that it is provided with an inserting mechanism to introduce the poultry into the actual conveying means so as to prevent any contact between the operator of the machine and the cutting mechanism. The conveying means also comprises two oppositely facing, endles belt mechanisms which are arranged so that they can accommodate carcasses of various sizes and weights while at the same time maintaining the carcasses centered in such a way that the blade which splits the carcasses into two pieces will always coincide with the plane of the backbone regardless of the size of the carcass being conveyed. In addition, the later of said two patents also employs two chutes for carrying the two thigh and back portions after severance from each other, to separate feeding mechanisms for advancing the thigh and back portions into contact with individual rotary cutters which sever the respective thighs from the connected back portion.

U.S. Pat. No. 3,816,875 discloses apparatus for performing a method for cutting meat, especially poultry, by means of a single cutter rotating at extremely high speed. The cutter projects upwardly through a slot in a table upon which the poultry is guided and directly below the table, a manifold is positioned adjacent the periphery of the cutter, said manifold including a pair of nozzles for directing a stream of liquid, such as cold water, on opposite sides of the periphery of the blade. A major portion of the rotary cutter and the manifold are contained within an enclosure, only a portion of the blade projecting from the slot in the table; the purpose of this enclosure being to limit the amount of water thrown out by centrifugal force. It is to be noted that the volume of water supplied and the positioning of the nozzles close to the periphery of the rotating blade is designed to prevent an excessive discharge of water, either from the blades, or onto the meat itself.

In our prior U.S. Pat. No. 3,950,820, it was not possible to shield each of the rotary blades and to supply the water in the same manner as shown in U.S. Pat. No. 3,816,875 because of space limitations. However, an attempt to utilize the principles of the water jet system, a single nozzle was placed adjacent each of the blades, which nozzle projected only a minimum amount of water directed at the periphery of the cutters.

While the system just described appeared to operate satisfactorily, it was considered that further improvement in the system could be made. Therefore, while it is believed that an excess of water thrown off from the rotating blades upon the meat being cut would be deleterious, this had to be contrasted with the fact that experience has shown that an increase in the amount of water applied to the blades has resulted in an increase in efficiency and a marked effect on the taste of the meat when cooked. Therefore, it is an object of the present invention to take advantage of the application of water to the rotary blades so as to increase the efficiency of operation, while at the same time minimizing any excessive application of water to the meat itself. This has been accomplished in a preferred example of the invention by arranging a series of nozzles extending in radial alignment along both sides of each of the rotary knives in the machine so as to expose the entire surface of both sides of the knife to the effect of jets of cold water. While this results in an increase in the amount of water thrown off from each of the blades, the arrangement of the blades is such that the water thrown off does not cover a major portion of the carcass as it moves through the machine, but is collected on the side walls and drained off at the bottom below the level of the portions as they are collected. In addition, since the elapsed time from the moment the original poultry body enters the conveying system until the severed portions are delivered to the collecting area at the bottom of the machine averages in the neighborhood of two and a half to three seconds, it is obviously impossible for any excessive amount of water to become deposited on the meat itself.

Since there are only minor changes in the mechanical arrangement of the present cutting machine, the apparatus disclosed herein can be understood by reference to said earlier U.S. Pat. No. 3,950,820, and for the sake of simplicity, a number of elements shown in that patent are eliminated from the drawings of the present application, although similar elements shown herein are identified by reference numerals similar to those of the earlier patent.

Figure 1:
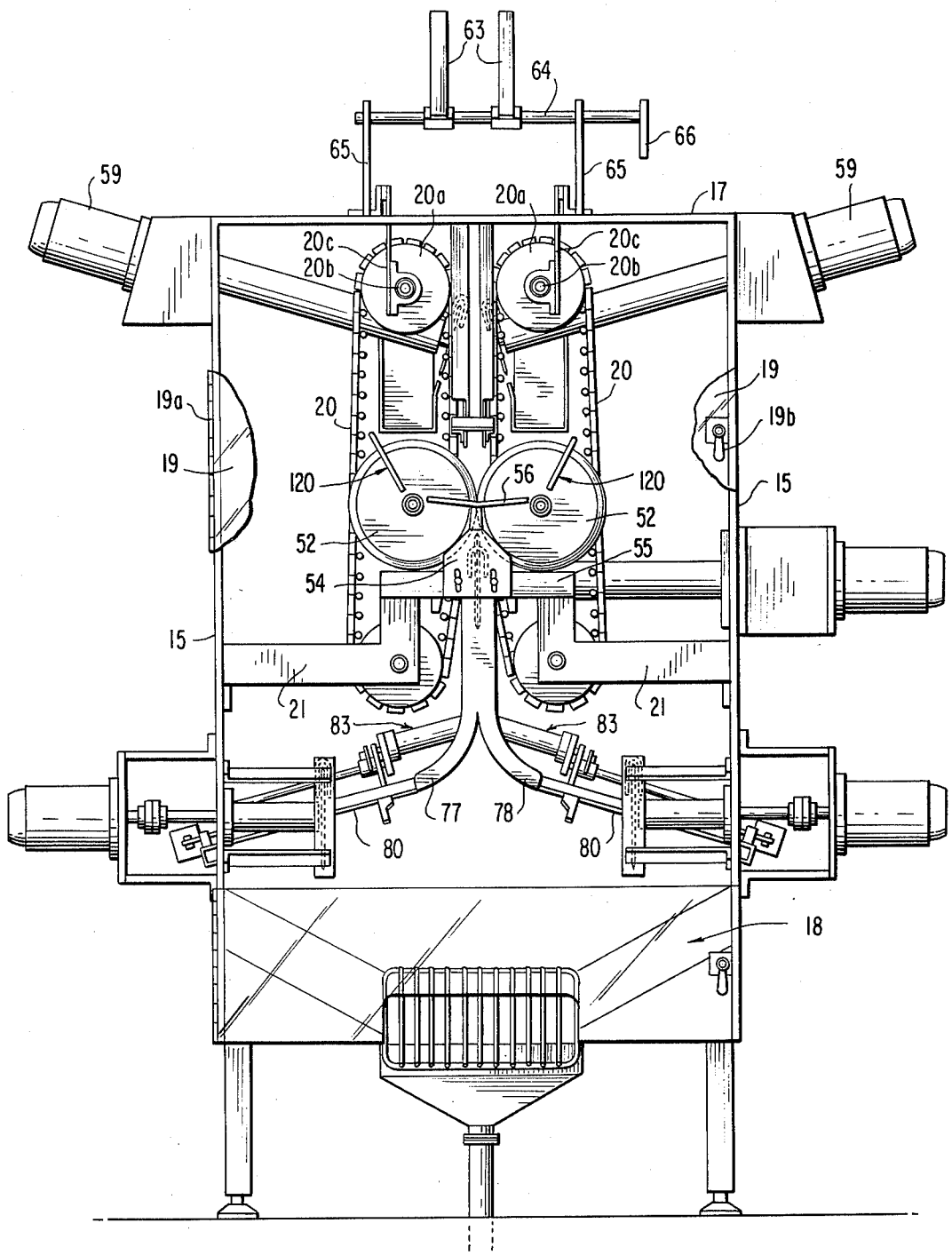
FIG. 1 is a front elevation of a preferred form of machine for automatically cutting eviscerated poultry bodies into a number of separate portions according to the present invention.
Figure 2:
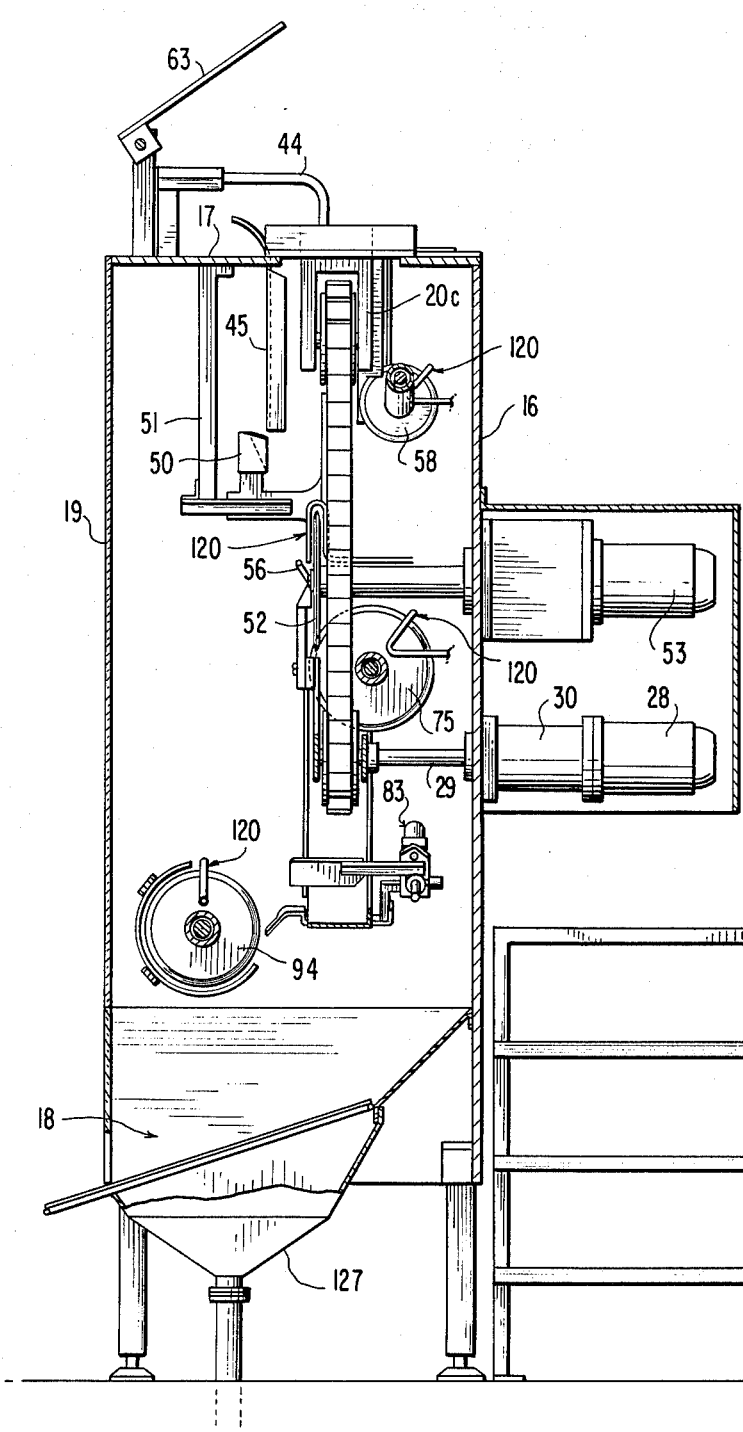
FIG. 2 is a view in elevation taken from the right side of FIG. 1.

As can be seen from FIGS. 1 and 2, the operating components of the poultry sectioning machine are contained within a generally rectangular enclosure having side panels 15, rear panel 16, top wall 17, a collection area 18 at the bottom into which the severed pieces drop by gravity and may be connected with the inlet of a distributing conveyor system (not shown), the enclosure being completed by a front panel 19, which may be connected to one of the side walls by means of a hinge 19a and secured in its closed position by means of latches 19b. A portion of the top panel is cut away to permit the introduction of the poultry carcasses. Just below this opening, there are a pair of oppositely disposed, coacting, endless conveyors 20, consisting of a series of pivotally connected, toothed metal pads for gripping the opposite sides of the thigh and ribcage. The lower ends of the conveyors are carried by sprocket wheels which are rotatably supported by the L-shaped arms 21, attached to side walls 15. The upper ends of the conveyors are rotatably supported by a pair of idlers, these idlers being supported by journals 20b which, in turn, are supported by leaf springs 20c, which depend from the top wall 17, the effect of this arrangement being such that the space between the two conveyors 20 will adjust to accept carcasses of varying sizes. If the springs 20c are of substantially equal force, they will be spread apart from each other by an equal amount as the carcasses pass through the conveyor with the result that the carcasses, regardless of size will always be centered with respect to a common vertical plane as they pass through the conveyor.

In the prior form of the invention, the conveyors 20 were driven from their upper ends, but in the present form, the motor 28 is positioned at the back of the machine and is connected with a shaft 29 by means of the reduction gear 30, the shaft 29 being connected with appropriate gearing (not shown) for driving the lower sprockets of the conveyors. With this arrangement, the opposing tracks of the two endless conveyors move downwardly together at the same speed, while the distance between them at the upper feeding end will be varied to accept birds of varying sizes, while keeping the carcasses centered with respect to the other components of the machine.

At the feeding station at the top of the machine, there are several guides which cooperate with the conveyors for positioning a carcass and its extremities as it enters the machine. First, there are two L-shaped, parallel rods 44 mounted on a bracket at the front to project downwardly into the entrance opening and spaced in front of the conveyor track. Second, there is a rearwardly-facing, channel-shaped guide 45 spaced forwardly of the guide rods to guide the ends of the legs of a carcass for a certain distance along the conveyors.

Just below the lower end of channel guide 45, there is a short section 50, which is displaced further away from the conveyors to cause the legs of the bird to drop abruptly downwardly a short distance when meeting the knives which sever them from the thighs. This short channel is supported by an L-shaped bracket 51, connected at one end to the top wall 17 so that the lower end can also support the lower ends of rods 44. Severing of the two legs at this point and slicing off of the breast meat is accomplished by two tangentially arranged knives 52, which are rotated at high speed by geared motors 53, mounted on the back wall 16. A triangular plate 54, mounted on a bridge 55, connecting the arms 21, deflects the severed meat away from the knives and a transverse rod 56, above the plate, prevents possible jamming of these knives by material which might stick to the blades.

Turning back to the feeding station at the top of the enclosure, there can be seen a pair of angularly related knives 58, driven by geared motors 59 attached to the sides walls 15. A series of guides (not shown) at the feeding station hold the thighs and legs outwardly so that they will pass the knives 58 while other guide means are provided to ensure that the wings will be severed from the carcass by the knives 58. To introduce the bird into engagement with the conveyors, a feeding mechanism is mounted on the top wall which includes a pair of parallel arms 63 attached to a shaft 64 supported in horizontal position in brackets 65. A short actuating lever 66 is attached at one end of the shaft and connected to a power source (not shown) which causes the arms 63 to rotate downwardly against the legs of a bird forcing the carcass downwardly a sufficient amount to enable the knives 58 to sever the wings and to force the carcass into the conveyor system 20.

After the severed wings have dropped into the collection chamber, the body is carried down to a position where the legs leave the guides 45 and 50, the body assumes a more or less vertical position so that the legs and breast meat are severed by knives 52 where they drop into the collection chamber. During this portion of downward travel, the carcass is urged toward the guide rods 44 by a second pair of slightly curved resiliently mounted guide rods (not shown) which keeps the carcass properly positioned with respect to the knives 52 and plate 54 and also holds the carcass in position immediately thereafter while the carcass is being split into two similar pieces by the knife 75, driven by geared motor 76 mounted on one of the side walls 15. At this point, the respective halves drop into a pair of outwardly facing chutes 77 and 78. The final severing of the thighs from each half of the ribcage takes place at the lower ends of the respective chutes, where the lower ends of the chutes 80 turn in a direction towards the front of the enclosure. At this point, the two mechanisms, indicated by numeral 83, push each of the attached sections of thigh and ribcage towards the hinged wall 19 and into the path of the two rotating knives 94, which severs the respective thigh from its ribcage, the severed parts falling into the collection area 18.

In the prior U.S. Pat. No. 3,816,875, it was disclosed that the use of a circular cutting blade rotating at high speed will enhance the flavor of poultry meat, as compared to cutting of the meat by hand, if the peripheral area of the blade is subjected to the stream of cold water applied to each side from a manifold. At that time, it was considered that only the peripheral area of the blade should be wetted and that the amount of water applied should be restricted to a volume such that no more than the fine atomized mist would be thrown off from the blade by centrifugal force.

Since that time, we have found that the limitations on the volume of water is not necessary and that it is preferable to distribute the water over as much of the surfaces of both sides of the blade as possible. In fact, difficulties had been experienced in the past in that where an insufficient supply of water was fed to the surfaces of the rotary cutter 75, which divides the carcass in half in the plane of the backbone, had resulted in the jamming of this blade with consequent stoppage of the entire machine being necessary.

Figure 3:
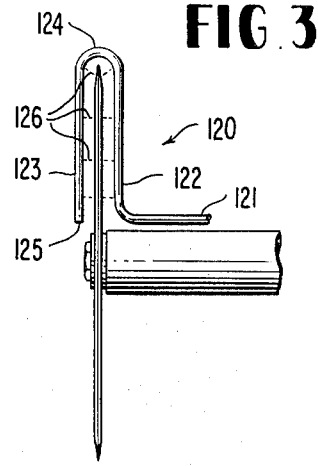
FIG. 3 is an end view of a typical rotating knife illustrating the arrangement of the liquid distributing system incorporated in this invention.

Consequently, the form of multiple nozzles shown in FIG. 3, and indicated by numeral 120, is arranged in conjunction with each of the cutting means for distributing liquid to each of the blades 52, 58, 75 and 94. It consists of a section of metal tubing, having one end 121 connected to source of cold water under pressure (not shown) and leading to two parallel sections 122 and 123 extending in a radial direction adjacent both sides of a knife between a point near the axis of the blade and joined to each other adjacent the periphery of the knife edge by a curved section 124. The far end 125 of section 123 is closed and a series of openings are provided at spaced intervals along the walls of the parallel sections 122 and 123 and the curved section 124 facing the rotary knife so that when water is supplied under pressure at 121, a series of jet streams 126 are directed against both sides of the blades as well as the sharpened peripheral knife edge.

In one embodiment of the invention, the rotary cutters are driven by their respective motors at approximately 3400 rpm. The diameter of the blades 58 are about five inches, while the other blades 52, 75 and 94 are each about eight and one quarter inches in diameter. Since the water supplied to each of the blades by a multiple nozzle 120 covers substantially the entire area of both sides of each blade, it is obvious that a considerable amount of water is thrown off from each blade by centrifugal force. Nevertheless, the water, apparently acting as a lubricant between the metal of the blade and the meat, bone and gristle of the poultry, has made it possible to increase the speed of the conveyor system (and thus reduce the time required for processing each poultry body) by some 15–20% over the earlier embodiment, so that with the present arrangement, the total time required to sever a poultry carcass into nine pieces is approximately 2½–3 seconds from the moment the bird enters the upper end of the conveyor system 20 to the time when the nine pieces drop into the collection area 18. Because of this minimal exposure of the meat to the water thrown off by the knife blades, the water is thrown against the side walls 15, back wall 16 and the hinged front wall 17, whereupon, it runs down to a drain 127 positioned below the grid which forms the collection area 18.

We claim:

1. In a machine of the type wherein a succession of eviscerated poultry carcasses are introduced at the input end of a conveyor means which carries the carcasses away from the input in a predetermined path into engagement with a plurality of circular knives spaced in succession along said path which automatically successively sever at least the breast meat, thighs and wings from each of said carcasses and split the carcasses into two portions, each of said circular knives being subjected to a stream of water, the improvement which comprises:

means for rotating each of said knives at a speed in excess of 2000 rpm;

nozzle means for each of said circular knives comprising at least two orifices each positioned respectively facing the opposite sides of the knives to direct jets of water against the opposite surfaces thereof over areas extending to points at least three-fourths of the distance inwardly from the peripheries of the knives;

conduit means for supplying water under pressure to each of said nozzle means;

enclosure means surrounding said conveyor means and circular knives for confining water thrown off by centrifugal force from said knives, and drain means for discharging excess water thrown off;

said enclosure means being provided with an opening for carcasses to be successively introduced to the conveyor means input, and having at least one other opening to permit removal of split carcasses and products severed from the carcasses;

said conveyor means including collector means to direct said split carcasses and products severed from the carcasses to said other opening to minimize contact with said water.

2. The invention defined in claim 1, wherein the peripheral speed of said cutters is in excess of 2800 feet per minute.

3. The invention defined in claim 1, wherein the peripheral speed of said cutters is in excess of 4500 feet per minute.

4. The invention defined in claim 1, wherein the speed of rotation of said cutters is in excess of 3000 rpm.

5. The invention defined in claim 4, wherein the peripheral speed of said cutters is in excess of 4000 feet per minute.

6. The invention defined in claim 4, wherein the peripheral speed of said cutters is in excess of 7000 feet per minute.

7. The invention defined in claim 1, wherein said conduit means comprises a generally U-shaped tubing and said nozzles comprise openings in said tubing.

* * * * *